US011247705B2

(12) United States Patent
Esposito et al.

(10) Patent No.: US 11,247,705 B2
(45) Date of Patent: Feb. 15, 2022

(54) TRAIN WHEEL MEASUREMENT PROCESS, AND ASSOCIATED SYSTEM

(71) Applicant: ALSTOM Transport Technologies, Saint-Ouen (FR)

(72) Inventors: Danilo Esposito, Barcelona (ES); Francesc-Xavier Cabre Puiggali, Barcelona (ES); Pau Gratacos Marti, Barcelona (ES); David Morley, Staffordshire (GB); Steve Dixon, West Midlands (GB); Josep Forest Collado, Girona (ES); Albert Torrent Palomeras, Girona (ES); Albert Ciurana Ferragutcases, Girona (ES); Joaquim Serra Mochales, Barcelona (ES)

(73) Assignee: Alstom Transport Technologies, Saint-Ouen (FR)

( * ) Notice: Subject to any disclaimer, the term of this patent is extended or adjusted under 35 U.S.C. 154(b) by 252 days.

(21) Appl. No.: 16/424,529

(22) Filed: May 29, 2019

(65) Prior Publication Data

US 2019/0367058 A1    Dec. 5, 2019

(30) Foreign Application Priority Data

Jun. 1, 2018 (EP) .................................... 18305678

(51) Int. Cl.
*G01B 11/10* (2006.01)
*B61K 9/12* (2006.01)
*G01B 11/25* (2006.01)

(52) U.S. Cl.
CPC ................ *B61K 9/12* (2013.01); *G01B 11/10* (2013.01); *G01B 11/2518* (2013.01)

(58) Field of Classification Search
CPC ....................................................... B61K 9/12
See application file for complete search history.

(56) References Cited

U.S. PATENT DOCUMENTS

| 5,636,026 A | 6/1997 | Mian et al. |
| 2003/0072001 A1 | 4/2003 | Mian et al. |
| 2004/0095585 A1 | 5/2004 | Nayebi |
| 2006/0232787 A1 | 10/2006 | Hoffmann et al. |

FOREIGN PATENT DOCUMENTS

| CN | 102901457 B | 4/2015 |
| ES | 2325389 A1 | 9/2009 |

OTHER PUBLICATIONS

European Search Report for EP Application No. 18305678, dated Oct. 1, 2018, 8 pp.

*Primary Examiner* — Rebecca C Bryant
(74) *Attorney, Agent, or Firm* — Soquel Group LLC

(57) ABSTRACT

A measurement process, intended for measuring at least one wheel of a train, including an acquisition step, during which a plurality of profiles of at least a part of the wheel are acquired by plurality of optical sensors, as the train moves in front of the optical sensors, a mapping step, during which, for each optical sensor, the profiles acquired by the optical sensor are joined by a control module, to obtain a map of the part of the wheel further transformed into a cloud of points, a rejoining step, during which the clouds of points obtained from the optical sensors are joined to form a three-dimensional image of the wheel, and an analysis step, during which a plurality of reference points and reference distances are measured on the three-dimensional image.

13 Claims, 4 Drawing Sheets

TRAIN WHEEL MEASUREMENT PROCESS, AND ASSOCIATED SYSTEM

CROSS-REFERENCE TO RELATED APPLICATIONS

This application claims priority of European Patent Application No. 18 305 678.7, filed on Jun. 1, 2018.

FIELD OF THE INVENTION

The present invention relates to a measurement process for measuring at least one wheel of a train with a measurement system. The invention also relates to a measurement system to implement the cited process.

BACKGROUND OF THE INVENTION

During circulation on the railway, the wheels of a train suffer from rolling wear, and eventually needs to be tuned or at worst needs to be replaced. In order to account for the wear, it is usual to measure the diameter of each wheel of a train during immobilization periods in a workshop. The measurement of the diameter is usually done with a manual tool, and has to be done on each wheel of the train, which can be time-consuming and inaccurate.

Other measurement methods exist for solid objects, offering much better accuracy, like three-dimensional scanning. Three-dimensional scanning is a method to analyze a real-world object or environment through to collect data on its shape. The collected data can then be used to construct digital three-dimensional models. Many different technologies, notably optical techniques, can be used to build scanning devices.

Laser triangulation is one such optical technique, where a laser source emits a beam that reflects on the object to be measured, to be observed by a camera located on a side of the laser beam. The source, object and camera form a triangle, allowing linking the position of the reflected laser light with a distance between the source and the object with high precision.

Laser triangulation is usually employed on an immobile object that is scanned from every angle to reconstruct a tridimensional model. However, the method is slow and impractical, requiring disassembling of the wheel. Implementing laser triangulation on a moving wheel is difficult, as the points illuminated by the laser beam have to permit deduction of the diameter.

There is a need of a process to measure the wheels of a train through an optical technique like laser triangulation, that is both easy to implement and accurate in its results.

SUMMARY OF THE DESCRIPTION

Thus, the invention relates to a process of the aforementioned type, characterized in that the process comprises the following steps:
- an acquisition step, during which a plurality of profiles of at least a part of the wheel are acquired by plurality of optical sensors through an optical technique, as the train moves in front of the optical sensors;
- a mapping step, during which, for each optical sensor, all the profiles acquired by the optical sensor are joined by a control module, to obtain a map of the part of the wheel, the map been further transformed into a cloud of points;
- a rejoining step, during which the clouds of points obtained from the optical sensors are joined to form a three-dimensional image of the wheel; and
- an analysis step, during which a plurality of reference points and reference distances are measured on the three-dimensional image.

According to further aspects of the invention, which are advantageous but not compulsory, the process according to the invention may include the following features, taken individually or under any technically possible combination:
- the process further comprises a detection step prior to the acquisition step, during which the train is detected by an identification sensor, triggering the acquisition step;
- during the acquisition phase, at least one of the optical sensors is an inner sensor acquiring a plurality of profiles of an inside part of the wheel, and at least one of the optical sensors is an outer sensor acquiring a plurality of profiles of an outside part of the wheel;
- during the acquisition step, each optical sensor acquires at least one hundred profiles of the part of the wheel;
- the optical technique is laser triangulation;
- during the analysis step, a wheel diameter is calculated from the reference distances and from previously measured values of the wheel diameter;
- the wheel diameter is calculated through the formula $D=D'-2*(FH-FH')$, where $D'$ is a previously measured value of the wheel diameter, $FH'$ is a previously measured value of a flange height, obtained at the same time as $D'$ and $FH$ is a flange height measured during the analysis step;
- during the rejoining step, each profile of each cloud of points is joined with at least one corresponding profile from another cloud of points, forming a complete profile of the wheel, the complete profiles forming the three-dimensional image of the wheel; and
- during the analysis step, a normalized profile is determined from among the complete profiles of the three-dimensional image, as the complete profile presenting a minimum measured flange height.

The invention also relates to a measurement system for measuring at least one wheel of a train, the measurement system comprising:
- a control module configured to implement the measurement process described above; and
- a plurality of optical sensors configured to acquire a plurality of profiles of a part of the wheel.

According to further aspects of the invention, which are advantageous but not compulsory, the system according to the invention may include the following features, taken individually or under any technically possible combination:
- the measurement system further comprises an identification sensor adapted to detect the train and trigger the acquisition step;
- each optical sensor comprises a laser source, adapted to project a beam of light, a shaping device, adapted to shape the beam of light into a planar beam, and a camera, adapted to acquire images of a contact area between the beam and the wheel, the images containing the profiles of the part of the wheel, the control module being configured to extract the profiles from the images; and
- the control module is further configured to access a database containing data from previous measurements of the wheel.

BRIEF DESCRIPTION OF THE DRAWINGS

The invention will be better understood on the basis of the following description, which is given only as an illustrative example, without restricting the scope of the invention. The description is given in correspondence with the annexed figures, among which.

DETAILED DESCRIPTION

Figure 1:
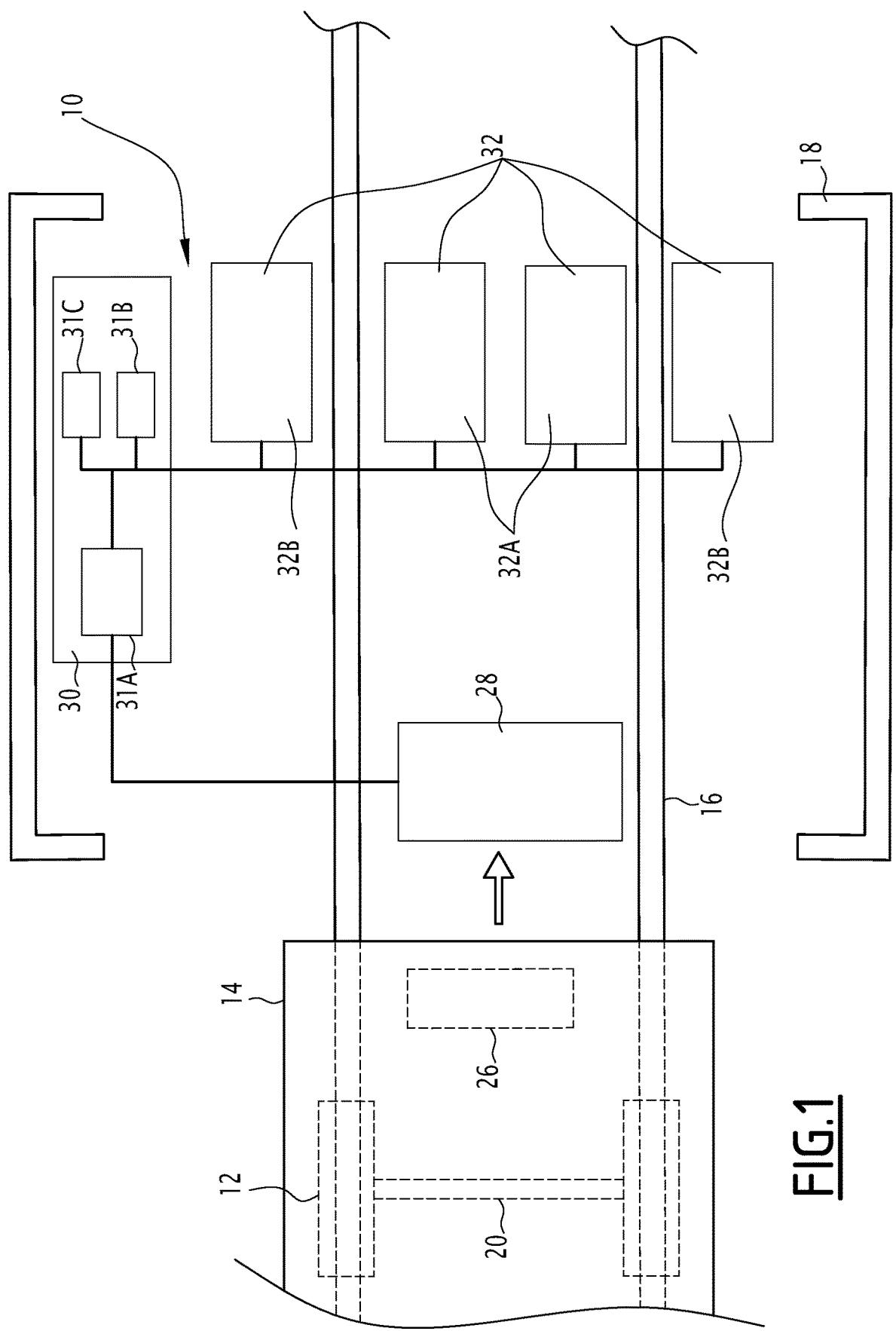
FIG. 1 is a top view of a measurement system of the wheels of a train, in accordance with an embodiment of the present invention.

A system 10 configured to measure the wheels 12 of a train 14 is represented schematically on FIG. 1. The system 10 is designed to implement a measurement process for measuring the wheels 12 based on an optical technique, for example laser triangulation.

The train 14 is circulating on rails 16 that lead into a canopy 18 protecting the system 10 from outside conditions, like rain, for example. The system 10 is designed to execute the measurement process on the wheels 12 of a moving train 14, when the train 14 enters or leaves the canopy 18.

In the following the functioning for one wheel 12 will be described, but it has to be noticed that the functioning is similar for the other wheels.

The wheel 12 is mounted on an axle 20 passing through its center. As shown on FIG. 2, the wheel 12 defines a cylindrical rolling surface 22 circling the periphery of the wheel 12, in contact with the rail 16. The rolling surface 22 is bordered by a flange 24 on the inside of the wheel 12 with respect to the train, the flange 24 presenting a diameter higher than the diameter of the rolling surface 22.

The train 14 comprises an identification device, for instance a radio-frequency identification device, configured to signal the arrival of the train 14. The identification device 26 is located on an underside of the hull, close to the front end of the train 14.

The system 10 comprises an identification sensor 28, for instance a radio-frequency identification sensor, adapted to detect the identification device 26 when the train 14 approaches the canopy 18, in order to initiate the measurement process. The identification sensor 28 is located in a box placed between the rails 16, and detects the identification device 26 as the train 14 passes over it.

The system 10 includes a central control module 30 adapted to implement the successive steps of the measurement procedure and gather the measured data to produce the results. The control module 30 includes a processor 31A designed to execute computer programs, a memory module 31B designed to store and restitute data, and a user interface 31C allowing an operator to interact with the control module 30. Finally, the control module 30 is able to access an external database to obtain data of previous measurements of the wheel 12.

The system 10 also includes four optical sensors 32, placed in four boxes located on each side of each rails 16, inside the canopy 18. The four optical sensors 32 form two pairs of optical sensors 32, each pair comprising an inner sensor 32A located on the inside of the rail 16 and an outer sensor 32B located on the outside of the rail 16. Each optical sensor 32 is designed to acquire a plurality of profiles of the wheel 12 passing in front of it, through an optical technique.

Figure 2:
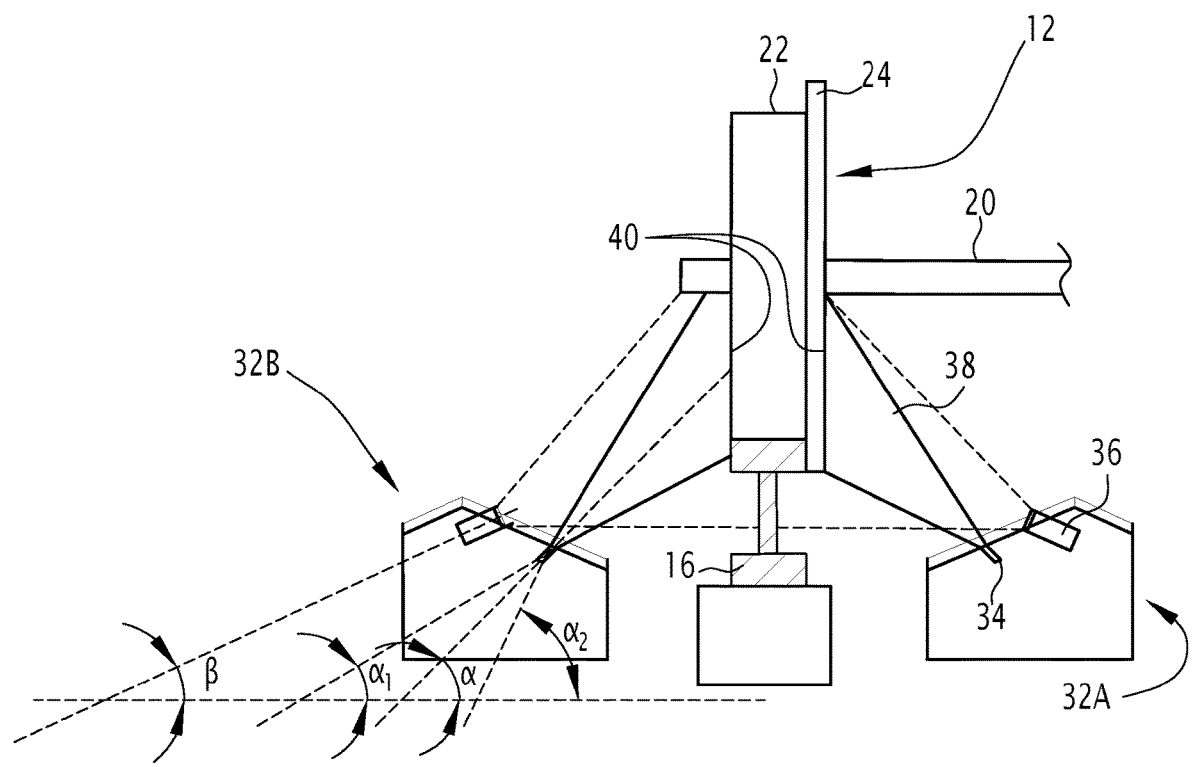
FIG. 2 is a face view of the measurement system from FIG. 1 in function, in accordance with an embodiment of the present invention.

As shown on FIG. 2, each optical sensor 32 acquires profiles of a side of the wheel 12, the inner sensor 32A acquiring profiles of an inner part of the wheel 12, and the outer sensor 32B acquiring profiles of an outer part of the wheel 12. The optical sensors 32 are linked to the control module 30, which starts the acquisition and gather the results.

The optical technique, in the represented example, is laser triangulation. Each optical sensor 32 includes a laser source 34 and a camera 36, as shown on FIG. 2.

The laser source 34 projects a beam 38 of light along a central axis of emission. The central axis of emission is located in a plane sensibly perpendicular to the rail 16.

The beam 38 is shaped by a shaping device (not shown) place on the laser source 34, into a planar beam.

Figure 3:
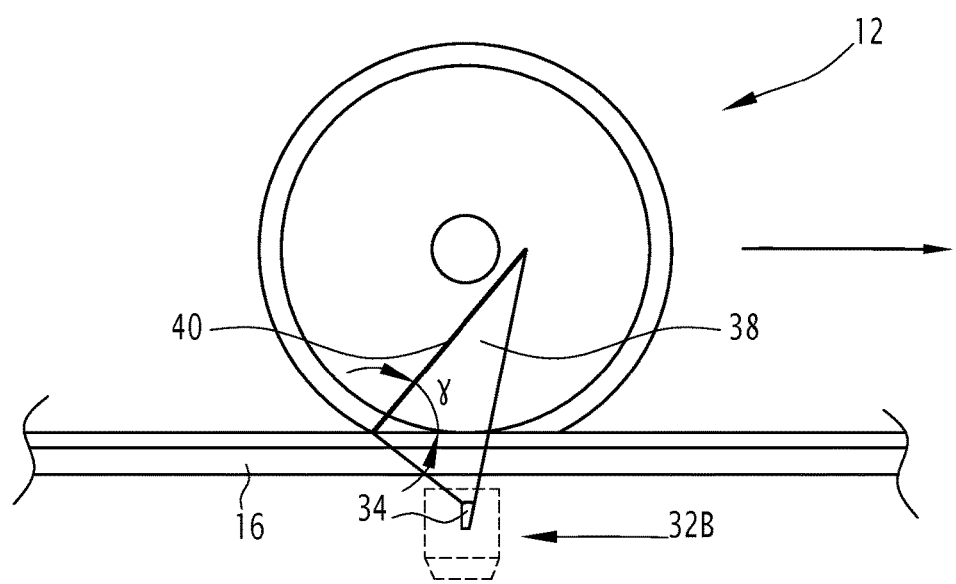
FIG. 3 is a side view of a laser source of the system from FIGS. 1 and 2, in accordance with an embodiment of the present invention.

As can be seen on FIG. 3, the planar beam 38 is inclined, and forms an inclination angle γ with the direction of the rail 16 in a vertical plane parallel to the rail 16. The inclination angle γ is comprised between 30° and 60°, for example equal to 45°.

The planar beam 38 forms a first angle α with the horizontal ground level in a plane perpendicular to the rail 16. Due to the inclination of the planar beam 38, the first angle α varies along the width of the planar beam 38 between a lowest value α1 and a highest value α2.

The planar beam 38 is oriented to intersect a rear part of the wheel 12 passing in front of the optical sensor 32, forming a contact area 40 with the wheel. The direction of the movement of the train 14 is indicated by the arrow on FIG. 3.

The camera 36 presents a central axis of acquisition forming a second angle β with the horizontal ground level in a plane perpendicular to the rail 16, with the second angle β being outside the range comprised between the lowest angle α1 and the highest angle α2.

The camera 36 is adapted to acquire images of the contact area 40 between the planar beam 38 and the wheel 12, with a set acquisition frequency.

Each image of the contact area 40 is a two-dimensional image acquired by the camera 36 of a three-dimensional profile of a part of the wheel 12. The profiles from the images of a series of images acquired by the optical sensor 32 form a series of parallel profiles of the part of the wheel 12. The distance between successive profiles in the series depends on the speed of the train 14 relative to the acquisition frequency of the camera 36. The images are sent from the optical sensor 32 to the control module 30 for analysis.

The control module 30 is adapted to analyze the two-dimensional images acquired by each optical sensor 32 to extract the three-dimensional profiles, and to combine the profiles to create a map of the wheel 12.

The control module 30 extracts the profiles from the images by linking the distance between the laser source 34 and the contact area 40 to the position of the contact area 40 on the image acquired by the camera 36. The distance is obtained by a known geometrical method, through the lowest value α1 and the highest value α2 of the first angle α, the second angle β and the inclination angle γ, as well as the relative positions of the source 34 and the camera 36.

The control module 30 is also adapted to compute a normalized profile from the three-dimensional profiles, and to detect on the profiles a plurality of reference points and reference distances, notably in order to determine the radius of the wheel 12.

The control module 30 is finally able to store the results in the memory module 31B and display them to the operator through the interface 31C, for validation or rejection of the operating conditions of the wheel 12.

Figure 6:
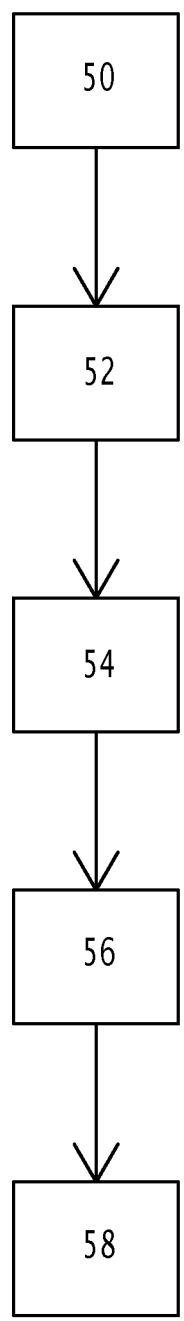
FIG. 6 is a schematic representation of the successive steps of the measurement process, in accordance with an embodiment of the present invention.

The measurement process of the wheel 12 of the train 14 derives from the structure of the measurement system 10 described earlier, and will now be described in its entirety, in reference to FIG. 6.

The measurement process is implemented on the wheels 12 of the train 14, while it moves into or out of the canopy 18.

In a detection step 50, the identification sensor 28 of the measuring system 10 detects the identification device 26 located on the train 14 as the train 14 passes over it. The identification sensor 28 sends a notice to the control module 30, which initiates an acquisition step 52.

During the acquisition step 52, the optical sensors 32 continuously acquire images of the wheels 12 passing before them through an optical technique. The optical technique, as described earlier, is for example laser triangulation.

Each optical sensor 32 thus acquires a series of images, each image containing a profile or a series of profiles of a part of the wheel 12. In the example represented on FIG. 2, the inner optical sensor 32A acquires images of the inner part of the wheel 12 and the outer optical sensor 32B acquires profiles of an outer part of the wheel 12. The optical sensors 32 then send the series of images to the control module 30 for analysis.

In a mapping step 54, the control module 30 extracts the profiles from the images sent by the optical sensors 32, to create a series of profiles of a part of wheel 12 for each optical sensor 32.

The series of profiles represent a large number of profiles of the part of the wheel 12, depending on the speed of the train 14 relative to the acquisition frequency of the camera 36. For example, each optical sensor 32 acquires at least one hundred profiles of the part of the wheel 12. The series of profiles are sent to the control module 30 and stored in the memory module 31B to be analyzed.

During the mapping step 54, the profiles of each series of profiles are joined by the control module 30, in order to create a map of each one of the parts of the wheels 12 observed by the optical modules 32, as described before.

Figure 4:
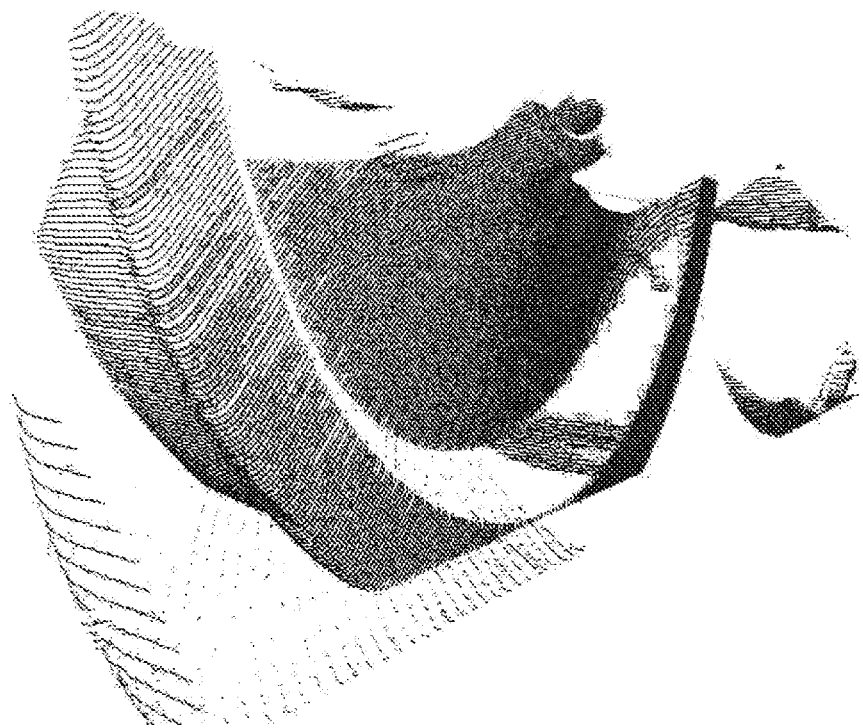
FIG. 4 is a representation of successive scans of a wheel by the system from FIGS. 1 and 2, in accordance with an embodiment of the present invention.

The map is then transformed into a three-dimensional cloud of points, as represented on FIG. 4. The coordinates of each point of the three-dimensional cloud of points depend on the distance between the optical sensor 32 and the point in the map, and the position of the optical sensor 32. The cloud of points includes all the profiles of the series of profiles, parallel to each other, as represented on FIG. 4.

In a rejoining step 56, the three-dimensional clouds of points obtained from the inner sensor 32A and the outer sensor 32B of the inner and outer parts of the wheel 12 are joined to form a three-dimensional image of the entire wheel 12. For this, each profile of each cloud of points is joined with the corresponding profile from each other cloud of points, forming a complete profile of both sides of the wheel 12. The three-dimensional image is thus formed by all the complete profiles.

The three-dimensional image is then displayed through the user interface 31C to the operator for inspection and stored in the memory module 31B.

In an analysis step 58, a plurality of reference points and a plurality of reference distances are detected on each complete profile of the three-dimensional image.

Figure 5:
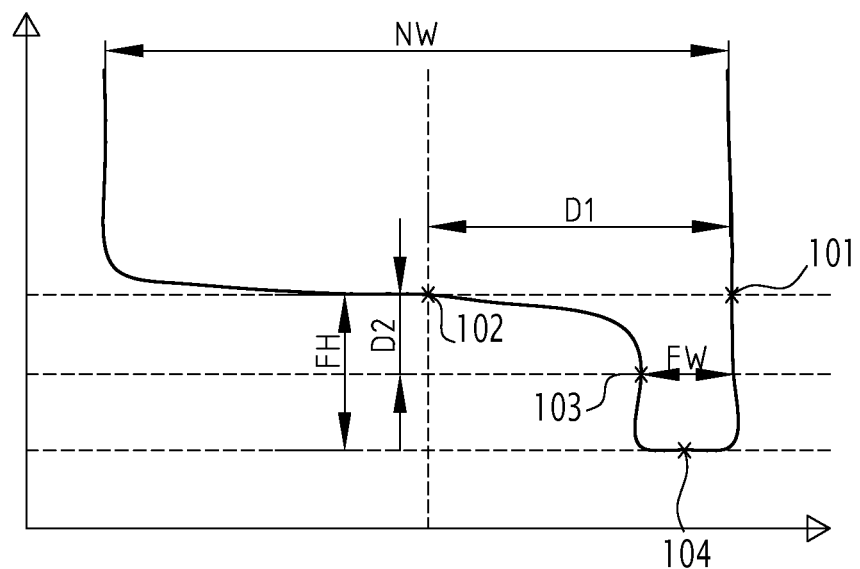
FIG. 5 is a representation of a profile of the wheel obtained from the scans from FIG. 4, with reference distances indicated, in accordance with an embodiment of the present invention.

On FIG. 5 is represented a part of one complete profile of the rejoined three-dimensional cloud of points, imaging the rolling surface 22 and the flange 24 of wheel 12. The following reference points and reference distances are detected on the complete profile during the analysis step 58:

a first point 101 and a second point 102, having same coordinates on the vertical axis, and being separated by a first predetermined distance D1 on the horizontal axis;

a third point 103, located on the inside part of the flange 24, being separated from the second point 102 by a second predetermined distance D2 on the vertical axis;

a fourth point 104, presenting the lowest coordinate on the vertical axis of the complete profile;

a flange width FW, taken equal to the difference of coordinates on the horizontal axis between the first point 101 and the third point 103; and a flange height FH taken equal to the difference of coordinates on the vertical axis between the second point 102 and the fourth point 104.

The first predetermined distance al is for example comprised between 50 mm and 100 mm, notably equal to 70 mm.

The second predetermined distance D2 is for example comprised between 10 mm and 20 mm, notably equal to 13 mm.

The flange height FH is calculated for each complete profile of the image, in order to determine a normalized profile. The normalized profile is taken as the complete profile with the lowest measured value of flange height FH. This is due to the fact that the complete profile with the minimal distance between the flange top and the rolling surface 22, and thus the lowest measured flange height FH, is the complete profile going through the center of the wheel 12, and intersecting the circumference of the wheel 12 in an orthogonal direction.

Advantageously, points from up to four of the complete profiles of the series closest to the normalized profile are added to the normalized profile in order to increase a density of points in the normalized profile. This increase in density of points reduces the impact of acquisition errors, and increases the number of points to improve the accuracy of calculations.

The wheel diameter D is determined from the normalized profile, with the following formula: $D=D'-2*(FH-FH')$. Here, D' is a previously measured value of the wheel diameter, taken from the database by the control module 30, and FH' is a previously measured value of the flange height, obtained at the same time as D', and also taken from the database. FH is the flange height previously obtained on the normalized profile.

Advantageously, D' and FH' are measured on the wheel 12 just after it is made with a lathe, and stored in the database before the wheel 12 is installed on the train 14 for use.

The determination of the wheel diameter through flange height measurement and previous values is more precise than a direct measurement of the diameter. A direct measurement would require acquiring a complete profile going through the center of the wheel and two opposite borders, which is difficult to implement precisely.

Additionally, several other reference distances can be measured on the normalized profile.

The other distances include a flange back excess material, a tread roll-over, a maximum step in flange, a flange profile radius and a back to back distance.

The flange back excess material is taken equal to the difference of coordinates on the horizontal axis between the first point 101 and a point of the normalized profile with coordinates on the horizontal axis furthest from those of the first point 101.

The tread roll-over is taken equal to the difference between the flange back excess material and a nominal width NW taken from the database. The nominal width NW is measured on the wheel 12 just after it is made with a lathe, and stored in the database before the wheel 12 is installed on the train 14 for use.

The nominal width NW is for example comprised between 100 mm and 150 mm, notably equal to 135 mm.

Advantageously, the tread roll-over is instead taken equal to 0 if the normalized profile comprises less than three different points located farther than the nominal width NW from the first point 101 on the horizontal axis. This is also the case if the points farther than the nominal width NW from the first point 101 are not within a predetermined correlation radius from at least one other. This prevents the case where the points farther than the nominal width NW from the first point 101 are the results of noise in the acquisition process, and thus have coordinates on the normalized profile not correlated with one another.

The maximum step in flange is taken as the maximum distance separating a point in the normalized profile from the next point when going through the normalized profile. The two points are considered for the determination of the maximum step in flange only if a line passing through them forms an angle smaller than 2° with the horizontal axis, in order to consider only points from a flange region of the normalized profile.

The flange profile radius is determined on the normalized profile, by finding a couple of points separated by a predetermined distance, for which the radius of curvature of the portion of the normalized profile between the points is the lowest. The flange profile radius is taken as the radius of curvature of this portion. The predetermined distance is for example 7.07 mm.

The back to back distance is taken as the distance between the first point 101 of the wheel 12 and an equivalent point located in the same place on the other wheel sharing the axle 20 with the wheel 12.

The invention claimed is:

1. A measurement process for measuring at least one wheel of a train, comprising:
    acquiring a plurality of profiles of a wheel of a train by a plurality of optical sensors through an optical technique, as the train moves in front of the optical sensors, wherein at least one of the optical sensors is an inner sensor acquiring a plurality of profiles of an inside part of the wheel, and at least one of the optical sensors is an outer sensor acquiring a plurality of profiles of an outside part of the wheel;
    for each optical sensor, joining, by a control module, the profiles acquired by the optical sensor, to obtain a map of the part of the wheel, the map being further transformed into a cloud of points;
    further joining together a plurality of clouds of points to generate a substantially complete three-dimensional image of the wheel, each cloud of points of the plurality of cloud of points being obtained from one optical sensor of the plurality of optical sensors; and
    measuring a plurality of reference points and reference distances on the generated three-dimensional image.

2. The measurement process from claim 1, further comprising, prior to said acquiring, detecting the train by an identification sensor, to trigger said acquiring.

3. The measurement process from claim 1, wherein each optical sensor acquires at least one hundred profiles of the part of the wheel.

4. The measurement process from claim 1, wherein the optical technique is laser triangulation.

5. The measurement process from claim 1, wherein said measuring comprises calculating a wheel diameter from the reference distances and from previously measured values of the wheel diameter stored in a database.

6. The measurement process from claim 5, wherein said measuring comprises measuring a flange height, FH, and wherein the process further comprises:
    acquiring a previously measured value of the wheel diameter, D', from the database; and
    acquiring a previously measured value of the flange height, FH', from the database; and
    calculating the wheel diameter through the formula D=D'−2*(FH−FH').

7. The measurement process from claim 1, wherein said further joining comprises joining each profile of each cloud of points with at least one corresponding profile from another cloud of points.

8. The measurement process from claim 7, wherein said measuring comprises determining a normalized profile from among the complete profiles of the three-dimensional image, as the complete profile that presents a minimum measured flange height.

9. A measurement system for measuring at least one wheel of a train, the measurement system comprising:
    a plurality of optical sensors configured to acquire a plurality of profiles of a part of a wheel of a train, wherein at least one of the optical sensors is an inner sensor acquiring a plurality of profiles of an inside part of the wheel, and at least one of the optical sensors is an outer sensor acquiring a plurality of profiles of an outside part of the wheel; and
    a control module implementing a measurement process, comprising:
        acquiring a plurality of profiles of the wheel by said plurality of optical sensors through an optical technique, as the train moves in front of said optical sensors;
        for each said optical sensor, joining, by the control module, the profiles acquired by said optical sensor, to obtain a map of the part of the wheel, the map been further transformed into a cloud of points;
        further joining together a plurality of clouds of points to generate a substantially complete three-dimensional image of the wheel, each cloud of points of the plurality of cloud of points being obtained from one optical sensor of the plurality of optical sensors; and
        measuring a plurality of reference points and reference distances on the generated three-dimensional image.

10. The measurement system from claim 9, further comprising an identification sensor detecting the train and triggering the acquiring in the measurement process implemented by said control module.

11. The measurement system from claim 9, wherein each said optical sensor comprises:
    a laser source projecting a beam of light;
    a shaping device shaping the beam of light into a planar beam, beam; and
    a camera acquiring images of a contact area between the beam and the wheel, the images containing the profiles of the part of the wheel, and wherein said control module extracts the profiles from the images.

12. The measurement system from claim 9, wherein said control module accesses a database containing data from previous measurements of the wheel, and wherein the measuring in the measurement process implemented by said control module comprises calculating a wheel diameter from the reference distances and from previously measured values of the wheel diameter stored in the database.

13. The measurement process from claim 1, wherein said acquiring comprises acquiring, at a set frequency, successive images of a contact area between a laser planar beam and the wheel.

* * * * *